United States Patent [19]
Bush et al.

[11] Patent Number: 6,102,298
[45] Date of Patent: Aug. 15, 2000

[54] ULTRASONIC SPRAY COATING APPLICATION SYSTEM

[75] Inventors: Stephan Gary Bush, Sharonville; Robert Edward Stahley, Middletown, both of Ohio

[73] Assignee: The Procter & Gamble Company, Cincinnati, Ohio

[21] Appl. No.: 09/028,269

[22] Filed: Feb. 23, 1998

[51] Int. Cl.⁷ .................................................. B05B 17/06
[52] U.S. Cl. .......................... 239/4; 239/13; 239/102.2; 239/135
[58] Field of Search .............................. 239/4, 13, 102.2, 239/135, 132, 102.1

[56] References Cited

U.S. PATENT DOCUMENTS

| | | | |
|---|---|---|---|
| Re. 25,511 | 1/1964 | Magnuson | 141/160 |
| 2,357,679 | 9/1944 | Moench, Jr. | 91/2 |
| 2,855,244 | 10/1958 | Camp | 299/1 |
| 2,881,092 | 4/1959 | Sedlacsik, Jr. | 117/93 |
| 2,898,881 | 8/1959 | Straley | 118/24 |
| 2,982,319 | 5/1961 | Magnuson | 141/160 |
| 3,103,310 | 9/1963 | Lang | 239/4 |
| 3,198,170 | 8/1965 | Onishi | 118/627 |
| 3,214,101 | 10/1965 | Perron | 239/102 |
| 3,317,139 | 5/1967 | Freeland | 239/102 |
| 3,470,831 | 10/1969 | Von Drachenfels | 107/54 |
| 3,738,574 | 6/1973 | Guntersdorfer et al. | 239/102.2 |
| 3,765,606 | 10/1973 | Moss et al. | 239/102 |
| 4,085,893 | 4/1978 | Durley, III | 239/102 |
| 4,153,021 | 5/1979 | Hattori et al. | 123/119 EC |
| 4,153,201 | 5/1979 | Berger et al. | 239/102 |
| 4,277,025 | 7/1981 | Harvey | 239/102 |
| 4,337,896 | 7/1982 | Berger et al. | 239/102 |

(List continued on next page.)

OTHER PUBLICATIONS

Brochures—"Totalstat® Electrostatic Spraying Systems"—Cracker Spraying System, United Air Specialists, Inc., Pub. May 1994; "Totalstat® Electrostatic Spraying Systems"—Oven Band Coater "Micro–meter "Airless" Liquid Applicator"—Spray Dynamics®, Form #101.

*Primary Examiner*—Kevin Weldon
*Attorney, Agent, or Firm*—Leonard W. Lewis; Paul M. Ulrich

[57] ABSTRACT

An ultrasonic atomizer is provided including an ultrasonic vibrator, a reservoir, and a heat exchanger. The ultrasonic vibrator is connected to an amplifying section. The amplifying section has an exterior surface and a tip thereon. The amplifying section can be elongated and the amplifying section can be inclined at an angle that is preferably between about 5° to 10° from horizontal. The reservoir is in fluid communication with the exterior surface of the amplifying section. The reservoir contains a liquid. A pump can be located between the reservoir and the exterior surface of the amplifying section in order to assure a liquid flow rate of between about 10 to about 30 ml/min. The heat exchanger is provided in order to control the temperature and viscosity of the liquid. The liquid is directed to flow from the reservoir and over the exterior surface of the amplifying section to the tip. A feed tube having a dispensing end can be provided. The feed tube is located between the reservoir and the exterior surface of the amplifying section in order for the liquid to be dispensed from the dispensing end onto the exterior surface. Preferably, the feed tube passes through the heat exchanger prior to the liquid flowing over the amplifying section. The liquid is propelled from the tip in the form of droplets having a substantially horizontal velocity when the tip is oscillated upon actuation of the ultrasonic vibrator.

2 Claims, 6 Drawing Sheets

U.S. PATENT DOCUMENTS

| | | | |
|---|---|---|---|
| 4,377,985 | 3/1983 | Reba | 118/315 |
| 4,431,684 | 2/1984 | Strohmaier | 427/57 |
| 4,520,786 | 6/1985 | Thatcher et al. | 123/536 |
| 4,521,462 | 6/1985 | Smythe | 427/421 |
| 4,562,790 | 1/1986 | Leffke et al. | 118/24 |
| 4,647,471 | 3/1987 | Jenkins | 427/37 |
| 4,648,557 | 3/1987 | Young | 239/102.2 |
| 4,733,820 | 3/1988 | Endo et al. | 239/102.2 |
| 4,756,478 | 7/1988 | Endo et al. | 239/102.2 |
| 4,784,323 | 11/1988 | Miller | 239/102.2 |
| 4,925,699 | 5/1990 | Fagan | 427/28 |
| 4,978,067 | 12/1990 | Berger et al. | 239/102.2 |
| 5,110,286 | 5/1992 | Gaysert et al. | 239/102.2 |
| 5,110,616 | 5/1992 | Lair et al. | 427/9 |
| 5,166,000 | 11/1992 | Singh et al. | 428/428 |
| 5,219,120 | 6/1993 | Ehrenberg et al. | 239/11 |
| 5,366,553 | 11/1994 | Lair et al. | 118/682 |
| 5,387,444 | 2/1995 | Bachmann | 427/600 |
| 5,391,383 | 2/1995 | Sullivan et al. | 426/99 |
| 5,409,163 | 4/1995 | Erickson et al. | 239/4 |
| 5,470,600 | 11/1995 | Petelle et al. | 426/237 |
| 5,516,043 | 5/1996 | Manna et al. | 239/102.2 |
| 5,534,067 | 7/1996 | Fulker et al. | 118/681 |
| 5,540,384 | 7/1996 | Erickson et al. | 239/102.2 |
| 5,560,287 | 10/1996 | Petelle et al. | 99/451 |
| 5,582,348 | 12/1996 | Erickson et al. | 428/440 |
| 5,588,996 | 12/1996 | Costello | 118/668 |
| 5,622,752 | 4/1997 | Erickson et al. | 427/421 |
| 5,633,044 | 5/1997 | Linnonmaa | 427/421 |
| 5,669,971 | 9/1997 | Bok et al. | 118/300 |
| 5,855,323 | 1/1999 | Yost | 239/102.2 |

ULTRASONIC SPRAY COATING APPLICATION SYSTEM

FIELD OF THE INVENTION

The present invention relates to a method and apparatus for finishing of oven cooked food products. More particularly, this invention relates to an apparatus for coating oven cooked food products with liquids, flavored liquids, or liquid seasonings.

BACKGROUND OF THE INVENTION

French fried potato strips, commonly referred to as "French fries" are one of the most popular convenience foods and are served in most fast food restaurants. Most restaurants including large restaurants prefer to prepare the French fries from a frozen or chilled partially fried potato product (hereinafter par-fried) rather then go through the procedure of preparing French fries from raw potatoes. These par-fried potatoes are converted into finished French fries, that are ready to eat, by completion of the cooking process in the fast food restaurant.

Typically the cooking process involves dispensing a large bag of par-fries into a deep fryer using hot oil to finish cooking the fries. After the fries have been deep fried they are removed from the hot oil and the excess oil is drained off of the French fries. While the excess oil is being drained, salts or seasonings are typically sprinkled onto the French fries manually from a salt shaker by an employee of the restaurant. Thereafter, the fries are scooped up and placed into individual serving sized containers by the restaurant employee. One of the problems with cooking French fries in this manner is that this process is labor intensive. Another problem with cooking French fries in this manner is that it uses a large quantity of oil. Additionally, the taste and flavor of the french fries can vary depending on many factors such as, the number of cycles between changes of the hot oil, the amount of salt or seasoning the employee sprinkles onto the fries, or the duration of time the fries have been sitting after frying has been completed.

Some restaurant operators have attempted to address these problems by using oven cooking techniques. One major problem confronted by these restaurant operators is obtaining oven cooked fries which have the taste and texture of french fries cooked by frying in hot oil. Important features of French fries cooked by a deep frying process are interior moistness, crispness of the outer crust, slightly oily surface texture, and enhanced flavor or taste. However heretofore, achieving these product characteristics generally has not been possible when the food products are oven cooked. Most oven cooked products are typically tough, dry, and less lubricious than food products cooked by frying in hot oil.

All of these aforementioned problems are recognized by the consumer and, more particularly, by the fast food restaurant operators. As a result fast food restaurants seldom practice/use oven cooking techniques for preparing par-fried food products.

SUMMARY OF THE INVENTION

It is an object of the present invention to provide a method and an apparatus for finishing par-fried food products which can be flavored to suit each individual consumer by the fast food restaurant operator wherein the taste and surface texture of the food product is virtually indistinguishable from deep fried food products.

In one aspect of the present invention, an ultrasonic atomizer is provided including an ultrasonic vibrator, a reservoir, and a heat exchanger. The ultrasonic vibrator is connected to an amplifying section. The amplifying section has an exterior surface and a tip thereon. The amplifying section can be elongated and the amplifying section can be inclined at an angle that is preferably between about 5° to 10° from horizontal. The reservoir is in fluid communication with the exterior surface of the amplifying section. The reservoir contains a liquid and preferably the liquid is a vegetable oil. A pump can be located between the reservoir and the exterior surface of the amplifying section in order to assure a liquid flow rate of between about 10 to about 30 ml/min. The heat exchanger is provided in order to control the temperature and viscosity of the liquid. Preferably, the temperature of the liquid is about ambient or 72° F., more preferably, the temperature of the liquid is greater than about 90° F., and most preferably, the temperature of the liquid is between about 72° F. and 150° F. Preferably, the viscosity of the liquid is between about 20 to about 30 centipoise. The liquid is directed to flow from the reservoir and over the exterior surface of the amplifying section to the tip. A feed tube can be provided having a dispensing end. The feed tube is located between the reservoir and the exterior surface of the amplifying section in order for the liquid to be dispensed from the dispensing end onto the exterior surface. Preferably, the feed tube passes through the heat exchanger prior to the liquid flowing over the amplifying section. More preferably, the heat exchanger is located near the dispensing end of the feed tube. The liquid is propelled from the tip in the form of droplets having a substantially horizontal velocity when the tip is oscillated upon actuation of the ultrasonic vibrator. Alternatively, the ultrasonic atomizer can include multiple reservoirs in fluid communication with the exterior surface of the amplifying section.

In a second aspect of the present invention, a method for dispensing a liquid is provided. The method can include controlling the temperature and viscosity of a liquid; drawing the liquid onto a face of an amplifying section; oscillating the amplifying section; forming a film from the liquid on the face; generating surface waves on the film; detaching droplets from the surface waves; and imparting a substantially horizontal velocity to the detached droplets. The detached droplets form a polydisperse atomized spray having a penetration value L defined by the equation:

$$L = \frac{\rho D^2 V}{18\mu}$$

wherein a single droplet has a diameter D with an initial horizontal velocity V, and p is the density of the liquid and jA is the viscosity of the air. This method can also include the step of orienting the amplifying section such that it is inclined, preferably the amplifying section is inclined at an angle of about 5° to 10° from horizontal. Alternatively, the step of supplying multiple liquids from multiple reservoirs to the face of the amplifying section can also be included.

BRIEF DESCRIPTION OF THE DRAWINGS

While the specification concludes with claims which particularly point out and distinctly claim the invention, it is believed that the present invention will be better understood from the following description taken in conjunction with the appended claims and the accompanying drawings, in which like reference numerals identify identical elements and wherein:

FIG. 1 is a perspective view of a preferred embodiment of the present invention;

DETAILED DESCRIPTION OF THE INVENTION

As used herein the terms par-fried or par-fried food products refers to food products that have been subjected to at least one frying process such as deep frying, but which have not been completely cooked.

As used herein cooked refers to a procedure wherein food products are treated with heat prior to their consumption, such as, for example, by frying, baking, boiling, microwaving, heating in a toaster or toaster oven, etc. in order to convert the food product to a ready to eat form. Typically, cooking entails reducing the moisture content of the food product.

As used herein the term finished refers to a food product that has been cooked and also has been further treated by the application of edible oils or granular seasonings in order to place the food product in a flavorful and tasty ready to eat form.

Figure 1:
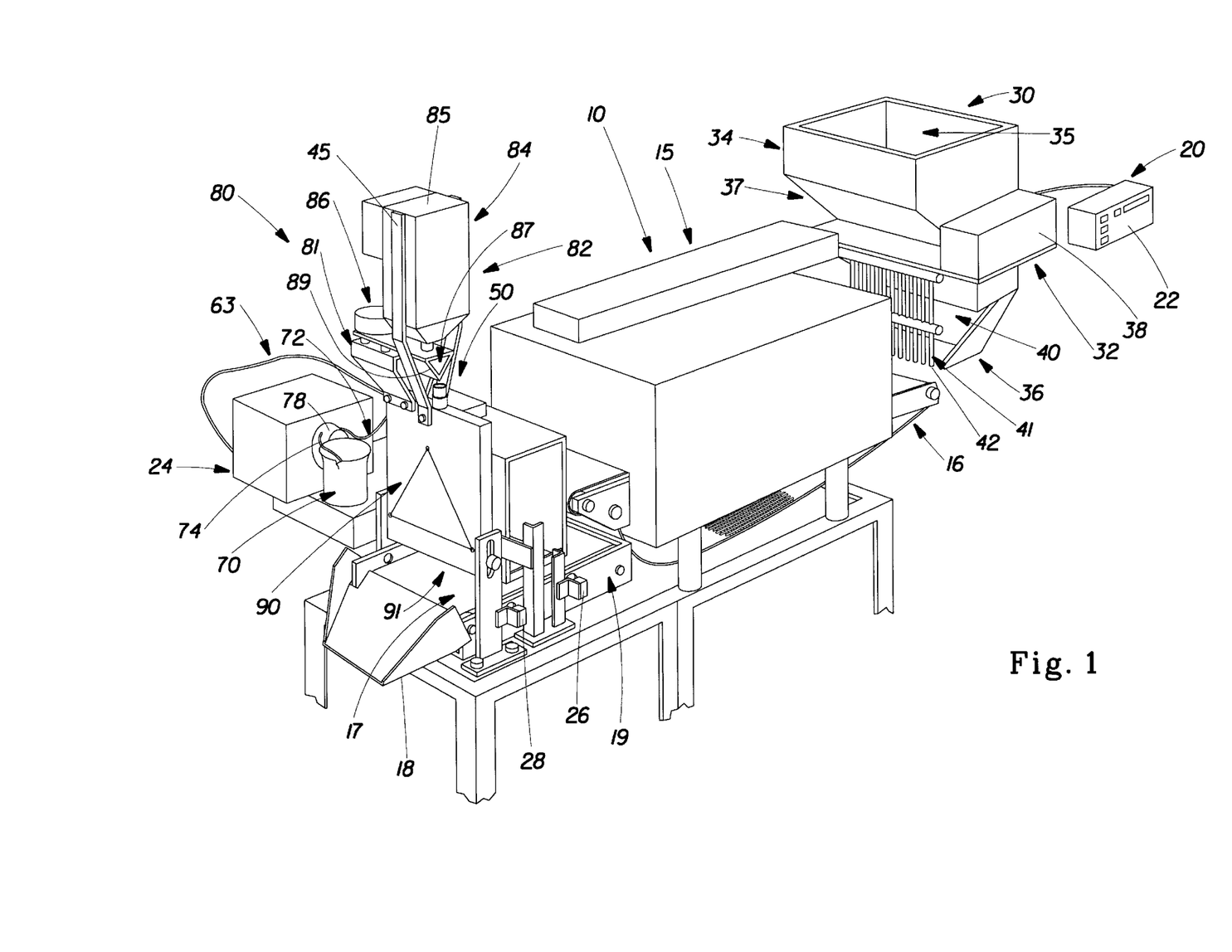

Referring now to FIG. 1, a finishing system for a food product is shown generally indicated as 10. The finishing system 10 includes an electronic controller 20, a storage hopper 30, an oven 15, a liquid coating apparatus 50, and a granular dispensing apparatus 80. Upon actuation of the electronic controller 20, the food product is dispensed from the storage hopper 30 onto a primary conveyor 16. The food product riding on the primary conveyor 16 is then conveyed by the primary conveyor 16 from the storage hopper 30 into and through the oven 15 where the food product is cooked. From the oven 15 the food product is dropped from the primary conveyor 16 onto the secondary conveyor 17 and is then conveyed to the liquid coating apparatus 50 where the food product is coated with a liquid. Thereafter, the food product is conveyed by the secondary conveyor 17 to the granular dispensing apparatus 80 where flowable solids are applied onto the food product. Finally the secondary conveyor 17 discharges the food product into a collection tray 18 where the finished food product can be placed into a serving container. Alternatively, the primary conveyor 16 and secondary conveyor 17 can be combined into one main conveying system. After completion of these steps, the food product is finished and is in a ready to eat from.

This oven finishing system 10 is used for finishing food products that have been previously partially cooked and then frozen. The use of par-fried food products is preferred for use with this invention and have been widely adopted in fast food restaurants because of the advantages they offer. A few of the recognized advantages associated with the use of frozen par-fried food products are, for example, users know the exact costs, the number of servings and the weight per serving portion. In addition, use of frozen, par-fried food products simplifies storage and inventory control, insures uniform quality from one season to another, and reduces labor and preparation time for serving. A wide variety of par-fried or frozen food products such as chicken, fish, onion rings, french fries, vegetables, pies, and the like, can be used with this oven finishing system 10.

In practicing a preferred embodiment of the present invention, it is preferred that par-fried french fries (par-fries) be made from potato strips known in the art as shoe strings. Shoe string potato strips as used herein refers to potato strips that are from about ³⁄₁₆ to about ⁵⁄₁₆ inches in cross section and from about 2.5 to about 5 inches in length. Frozen commercial shoe string par-fried potato strips can be supplied by J. R. Simplot Co., Caldwell, ID, under the tradename SIMPLOT PAR-FRIES. Other potato strips which may be used herein are known in the art as crinkle cut strips. Such strips usually average from about ⁵⁄₁₆ to about ½ inches in cross-section and from about 2 to about 4 inches in length. Also, straight potato strips (known as regular cut) being from about ⁵⁄₁₆ to about ½ inches in cross-section and about 2.5 to about 5 inches in length may be used. Larger potato strips of the type referred to as steak fries may also be used. Typically steak fries have a rectangular cross-section of about ½ inches to about ⅞ inches. These potato strips can be coated with, for example, gelatins, gums, or starches.

A process is provided for finishing the par-fried food product so that it is ready to be eaten immediately upon finishing. Immediately as used in this context means while the food product is still in a heated condition. This process includes the following steps: Actuating the electronic controller 20 which thereafter automatically initiates the remaining steps of the finishing process and which renders this process fully automated in that no further human interaction is not required. Dispensing a predetermined quantity of par-fried food product from a storage hopper 30 onto a conveyor. Conveying the food product continuously through the remaining stages of preparation. Heating the food product in an air impingement oven 15 until the food product is cooked. Applying a light coat of liquid such as a vegetable oil onto the food product. Placing a small amount of flowable solids such as a granular seasoning onto the food product. Thereafter, discharging the food product into or through a collection tray 18. Preferably, the food product is continuously conveyed through all of the steps in this finishing process in less than about 15 minutes, more preferably in less than about 10 minutes, even more preferably in between about 3 to 5 minutes, and most preferably in between about 4 to 4.5 minutes. In particular, the total moisture content of the food product, after being subjected to this finishing process, is preferably greater than about 10%, and more preferably greater than about 30%, and even more preferably between about 25% to about 65% total moisture.

The Electronic Controller

Referring again to FIG. 1, an electronic controller 20 is used to activate, control, and monitor the entire oven finishing system 10. This electronic controller 20 can initiate, and thereafter automatically maintain, the entire finishing process which prepares the food product for consumption. Preferably the electronic controller 20 is electrically connected to a standard fast food restaurant cash register. This will enable the oven finishing system 10 to begin a fully automated finishing process immediately upon receipt of an order for a particular food product from a consumer. For example, when an employee presses the cash register keys for a large order of french fries, or even multiple orders of varying sizes, the electronic controller 20 receives this signal and is programmed to initiate the finishing process for the exact orders and sizes that have been specified by the cash register. Thus, the electronic controller 20 reduces the time and labor needed to begin finishing of the food product. Additionally, since each order is processed immediately upon receipt, the food product will be freshly finished and consequently have a fresher taste.

A preferred electronic controller 20 is programmable and has a display panel 22 for input and monitoring of ongoing operations. The electronic controller 20 can include a processor (not shown) readily available from Control Microsystems under the tradename SCADAPack and also a display panel 22 readily available from AFE Technologies, Inc., under the tradename Data Panel 320T.

The Storage Hopper

As shown in FIG. 1, the storage hopper 30 includes a metering mechanism 32, storage bin 34, and a discharge chute 36. The metering mechanism 32 is located at the bottom of the storage bin 34. Preferably, the metering mechanism 32 includes an electronic measuring device 38. An electronic measuring device 38 that can be used with this metering mechanism 32 is readily available from Mettler Toledo, Inc. under the tradename PANTHER. The electronic measuring device 38 accurately weighs the food product so that the metering mechanism 32 dispenses the correct amount of food product through the discharge chute 36. A predetermined weight of the food product is dispensed based on the electronic signal received from the electronic controller 20. Alternatively, the metering mechanism 32 can be in the form of cups or cleats of a predetermined size affixed to a rotating spindle, indexing platform, or other device which is capable of accurately metering the food product through the discharge chute 36.

Figure 2:
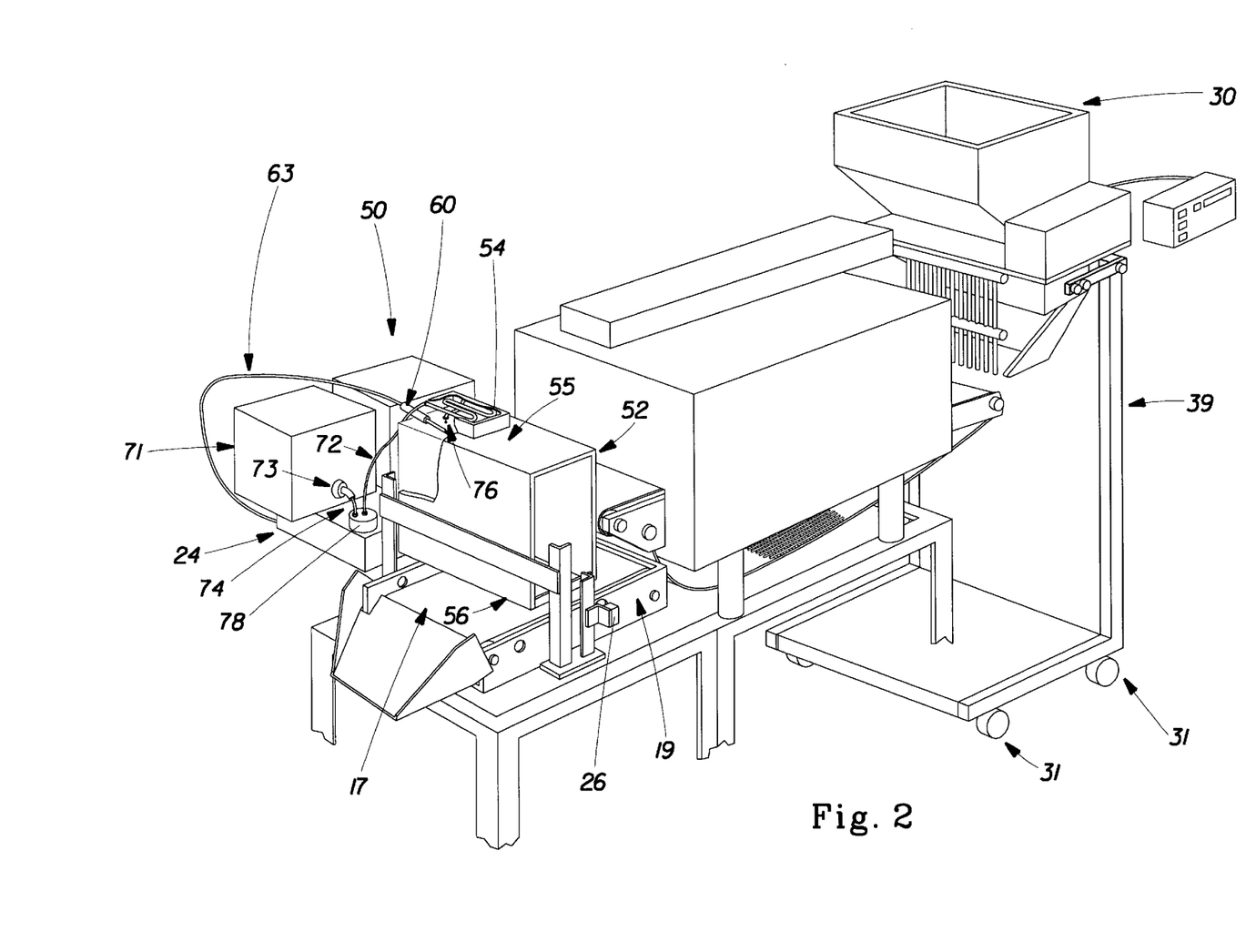
FIG. 2 is a perspective view of an alternative embodiment of the present invention, with the granular dispensing apparatus removed for clarity.

Preferably, the storage bin 34 is sized to contain a large bag of par-fries, more preferably about a 36 lb. case of par-fries, or a similar weight of other food product. As shown in FIG. 1, the storage bin 34 has an open top 35 with a somewhat tapered side wall configuration 37 which allows the food product to be manually dumped into the open top 35 and then gravity forces the food product to flow downward toward the metering mechanism 32. In order to allow ease of use of this storage hopper 30, a support frame 39, as shown in FIG. 2, is provided. The support frame 39 includes wheels 31 that enable the storage hopper 30 to be easily moved from one location to another. Additionally, the support frame 39 is configured such that the storage bin 34 can be raised and lowered. This allows easy access to the open top 35 of the storage bin 34 for cleaning and to pour additional food product into the storage bin 34. A hand truck such as a GENIE LIFT can be used as the support frame 39 for the storage hopper 30.

The discharge chute 36 on the storage hopper 30 is positioned below the metering mechanism 32 in order to receive the food product from the storage bin 34 and then direct the food product onto the primary conveyor 16 or into the oven 15. The discharge chute 36 includes a channel 40 and a grate 41 positioned just above or forward of the channel 40. The grate 41 is pivotally attached to the storage hopper 30 such that the grate 41 can swing outwardly in the direction of the primary conveyor 16 movement. The grate 41 includes alignment fingers 42 that help position the food product on top of the primary conveyor 16. In particular, as the food product is discharged through the discharge chute 36, the food product pushes against the alignment fingers 42 of the grate 41 in a manner that allows the grate 41 to urge the food product to lay flat against the primary conveyor 16 in order for the food product to ride on the primary conveyor 16 in a single layer.

The Oven

Many types of ovens can be used to cook par-fried food products. In particular, the advantages of this invention can be readily realized when the food products are cooked in an oven 15 such as a forced air convection oven, a hot air impingement oven, a combination of radiation and convection oven, a combined microwave and convection oven, a toaster or toaster oven, or a conventional oven. A preferred oven 15 for use with this invention is a dual air impingement type oven such as that described in U.S. Pat. No. 4,523,391 issued to Smith et al. on Jun. 18, 1985. This oven 15 is commercially available from the Frymaster Corporation under the tradename AIR FRYER. Ovens of this type are made for commercial restaurants and include a metal wire mesh type of conveyor that transports the food product into and continuously moves the food product through the oven 15 during cooking.

For example, when frozen par-fries are prepared for consumption, such as at a retail food outlet, the par-fried potato strips are preferably cooked in an oven 15 for from about ¾ minutes to about 15 minutes, the oven 15 being at a temperature from about 325° F. to about 800° F. A preferred time for such cooking in a dual air impingement oven 15, with the par-fries arranged in a single layer on the conveyor is from about 1 minute to about 5 minutes, and more preferably from about 2 to about 2.5 minutes, at a temperature between about 350° F. to about 500° F. The time and temperature for cooking an oven finished food product can vary depending upon the quantity of food product, the initial temperature of the food product, the specific type of oven 15 and the oven conditions (temperature, air velocity) used, and the thermal properties of the food product. In general higher thermal conductivity's and higher surface heat transfer coefficients will result in a more rapid transfer of heat from the oven 15 into the food product, resulting in reduced cooking time.

The Liquid Coating Apparatus

In order to apply a light coating of liquid or vegetable oil on the food product a liquid coating apparatus 50 is utilized. Preferably the oil is applied after the food product has been cooked in a dual air impingement type oven 15. As the food product is conveyed from the oven 15 the liquid coating apparatus 50 is automatically activated by a first sensor 26 located adjacent to the secondary conveyor 17. This first sensor 26 can detect the presence of food product riding on the secondary conveyor 17 as it approaches the liquid coating apparatus 50. Alternatively, the liquid coating apparatus 50 can be integrally attached to the oven 15 or even made as an internal component of the oven 15. When french fries are the finished food product, this light coating of oil improves the texture and taste of the final finished french fries.

Figure 3:
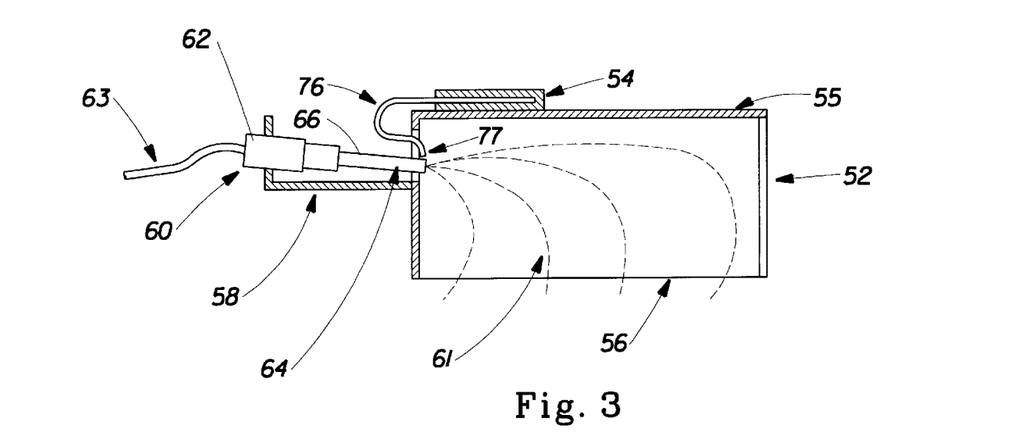
FIG. 3 is a sectional view of a preferred embodiment of the liquid coating apparatus.

Referring now to FIG. 2, the liquid coating apparatus 50 includes a housing 52 positioned over the secondary conveyor 17. The housing 52 contains an ultrasonic atomizer 60 which is used to create the spray coating that is applied to the food product as the food product moves past the ultrasonic atomizer 60 on the secondary conveyor 17. The housing 52 consists of a box shaped enclosure 55 having an open bottom 56. Preferably the secondary conveyor 17 passes just under the open bottom 56 of the housing 52. Referring now to FIG. 3, the enclosure 55 also includes a mounting plate 58. The ultrasonic atomizer 60 is attached to the housing 52 by the mounting plate 58 in a position above the open bottom 56 of the enclosure 55.

Figure 4:
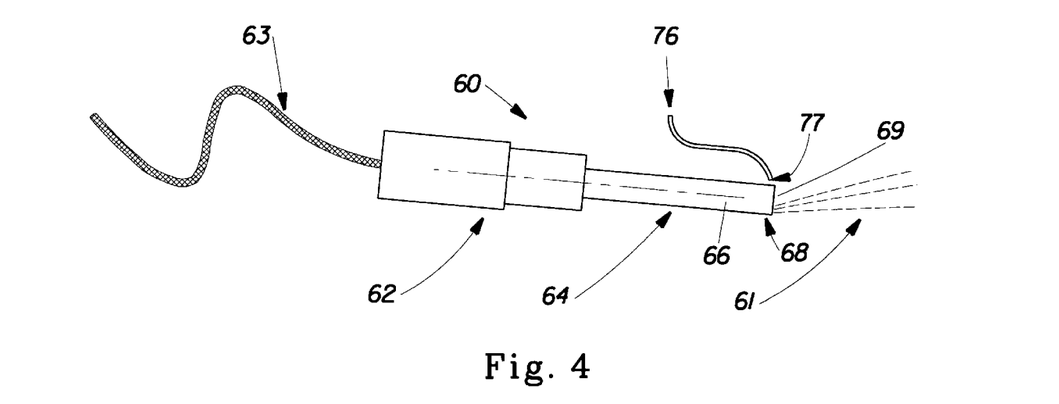
FIG. 4 is a side elevation view of the ultrasonic atomizer according to the present invention.

Referring now to FIG. 4, the ultrasonic atomizer 60 includes an ultrasonic vibrator 62 connected to an elongated, cylindrical amplifying section 64. The amplifying section 64 or horn is preferably solid and has an exterior surface 66 with a tip 68 on the end opposite the ultrasonic vibrator 62. Preferably the tip 68 is blunt, flat, or slightly rounded. The ultrasonic vibrator 62 is electrically connected to a power supply 24 (shown in FIG. 1) through the ultrasonic cable 63. The ultrasonic vibrator 62 used to drive the amplifying section 64 is preferably a piezoelectric transducer. Typical piezoelectric transducers can utilize quartz, barium titanate, lithium sulfate, lead metaniobate, lead zirconate titanate, or other types of crystals having high natural frequencies. Piezoelectric transducers can have a frequency range of from about 10 to 100 kHz. A preferred range of frequency is from about 20 kHz to about 40 kHz. The piezoelectric transducer or ultrasonic vibrator 62 can be used to impart a vibratory or oscillatory movement in the amplifying section 64. The tip 68 also oscillates due to the action of the ultrasonic vibrator 62 and the amplifying section 64. Alternatively, an ultrasonic homogenizer can be converted for use as the ultrasonic atomizer 60 in this liquid coating apparatus 50. Such a device is commercially available from Cole-Parmer Instrument Co., under the tradename Ultrasonic Homogenizer.

A preferred ultrasonic atomizer 60 is nominally rated at between about 50 W to about 100 W while typically operating in a power range less than or significantly below 50 W. The power supply 24 for the ultrasonic atomizer 60 needs to be capable of adjustment in order to compensate for temperature induced changes such as the viscosity of the liquid. Typically, as the viscosity of the liquid decreases, the oscillation amplitude is decreased to maintain the proper droplet size distribution across the secondary conveyor 17. A monitoring and feedback mechanism can be utilized to automatically correct the power levels of the ultrasonic atomizer 60 for a given liquid temperature.

Figure 5:
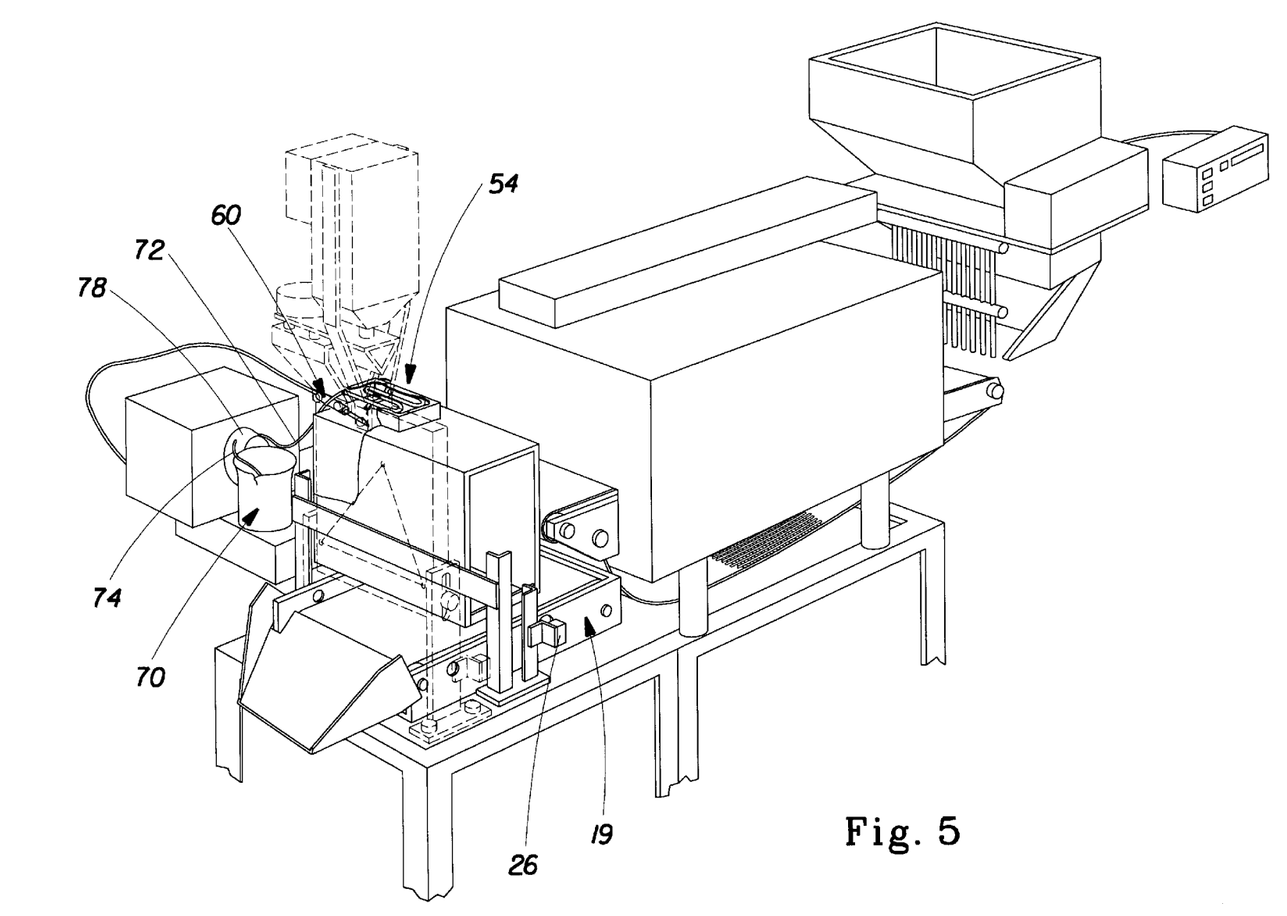
FIG. 5 is a perspective view of a preferred embodiment of the present invention, with the granular dispensing apparatus shown in broken line for clarity.

As seen in FIGS. 2 and 5, the ultrasonic atomizer 60 is in fluid communication with a reservoir 70 that contains a liquid. A feed tube 72 having a suction end 74 and a dispensing end 76 is used to connect the reservoir 70 in fluid communication to a pump 78 and then to the ultrasonic atomizer 60. In a preferred embodiment (shown in FIG. 2), a refill type container 71 or a bag-in-box type replaceable container 71 can be used to store the liquid in place of the reservoir 70. Preferably, the liquid contained in the reservoir 70 is a vegetable oil, food colorant, flavorant, flavored liquid, seasoning, or the like. Many of these liquids will include some small amount of solids or particulate matter in them, such as salt particles, flavor crystals, or the like. When french fries are used as the food product, a coating of vegetable oil and other liquid seasonings can improve the taste and texture, or even change the flavor of the final finished french fries.

A particularly preferred vegetable oil for use with this liquid coating apparatus 50 is readily available from The Procter & Gamble Company and is marketed under the tradename PRIMEX. A soy bean oil available from The Procter & Gamble Company under the tradename STERLING with a flavorant that is 0.3% by weight added natural talo flavor available from Duro Co. could also be used. Various other edible oils can be used with this invention including natural or synthetic fats and oils. The oil may be partially or completely hydrogenated or modified otherwise. Additionally non-toxic, fatty materials having property similar to triglycerides such as sucrose polyesters and Olean, from The Procter & Gamble Company, and reduced calorie fats and fat substitutes may also be used herein.

Preferably, a peristaltic pump 78 is used in order to assure adequate flow of the liquid to the ultrasonic atomizer 60. The flow rate through the feed tube 72 of this liquid coating apparatus 50 is preferably from about 10 to about 30 ml/min., more preferably, about 18 to about 24 ml/min, and most preferably about 18 ml/min., although the ultrasonic atomizer 60 described herein can produce a spray 61 at flow rates approaching zero. The pump 78 draws the liquid through the suction end 74 of the feed tube 72 and pumps the liquid to the ultrasonic atomizer 60 through the dispensing end 76 of the feed tube 72. More preferably, the feed tube 72 has a large inside diameter of between about $1/16$ inches to about $1/8$ inches Both rigid and flexible tubing can be used for stability and versatility respectively, in locating interfaces between the feed tube 72 and the various components of this liquid coating apparatus 50. In a particularly preferred embodiment, the feed tube 72 includes quick disconnect type connectors 73 for ease of use. Corresponding quick disconnect type connectors 73 can be likewise provided at the reservoir 70 and pump 78. Most preferably, this liquid coating apparatus 50 includes no valves or orifice constrictions that can clog and therefore, dispensing of particulate laden liquids can be easily achieved. In this configuration, when the pump 78 stops pumping the flow of liquid to the ultrasonic atomizer 60 ceases. Alternatively, the feed tube 72 can be an integral part of the replaceable container 71 causing the feed tube 72 to be replaced with each change of the container 71.

Some of the liquids used with this liquid coating apparatus 50 can be solid or semi-solid at room temperature. Consequently it is preferred that the viscosity of the liquid be controlled. The viscosity of the liquid can be controlled by heating or cooling the liquid such as by use of a heater or refrigerator either at the reservoir 70 or some other location. As shown in FIGS. 2 and 5, a heat exchanger 54 through which the liquid passes in route to the ultrasonic atomizer 60 can be used to heat or cool the liquid. Preferably, the heat exchanger 54 is located near the dispensing end 76 of the feed tube 72 between the pump 78 and the ultrasonic atomizer 60. Such a heat exchanger 54 can assure control of the liquid temperature at the point where the liquid is discharged from the dispensing end 76 of the feed tube 72 and onto the amplifying section 64 of the ultrasonic atomizer 60. The heat exchanger 54 can vary the temperature of the liquid and thereby change the viscosity of the liquid. Preferably a vegetable oil has a temperature of about ambient or 72° F., more preferably, the temperature of the vegetable oil is greater than about 90° F., and most preferably, the temperature of the vegetable oil is between about 72° F. to about 150° F. A preferred viscosity range for vegetable oil is between about 20 to about 30 cP (centipoise), more preferably about 25 cP, although the desired viscosity can vary depending on the width of the area and type of liquid to be sprayed. The viscosity of some liquids is within the desired operating ranges at ambient (72° F.) temperature conditions and these liquids do not require any further conditioning such as varying the temperature.

Referring back to FIGS. 3 and 4, the dispensing end 76 of the feed tube 72 is located in close proximity to the amplifying section 64 such that oil flows through the discharge opening 77 in the dispensing end 76 of the feed tube 72 and onto and over the exterior surface 66 of the amplifying section 64 of the ultrasonic atomizer 60. The liquid continues to flow and is drawn onto the tip 68 of the ultrasonic atomizer 60. Preferably the discharge opening 77 of the dispensing end 76 of the feed tube 72 is located immediately adjacent to the tip 68. Gravity and the pressure gradient caused by the flow of the liquid from the tip 68 causes the liquid to be drawn onto the face 69 of the tip 68. The tip 68 oscillates due to the ultrasonic vibrator 62 vibrating the amplifying section 64 which causes the liquid to be propelled or sprayed from the tip 68 in an atomized spray 61.

In the preferred configuration shown in FIG. 3, the atomizer is inclined with the tip 68 downward at a downward incline between about 5° to 10°, more preferably the downward incline is about a 6° angle below horizontal. In this configuration the liquid freely flows over the exterior surface 66 of the amplifying section 64 and onto the face 69 of the tip 68. While arranging the atomizer at an incline relative to a horizontal plane is preferred, this ultrasonic atomizer 60 can be disposed in various other orientations including vertical or horizontal. Since the liquid flows only over the exterior surface 66 of the amplifying section 64, the ultrasonic atomizer 60 can be easily cleaned in order to avoid contamination after use or when changing to a different kind of liquid. This configuration also avoids the problem of clogging which is common with ordinary atomizing nozzles.

Since ultrasonic atomizers 60 tend to produce low velocity sprays with little turbulence and, consequently narrow spray patterns, the ultrasonic atomizer 60 is preferably oriented such that the atomized spray travels across the width of the secondary conveyor 17. While other orientations can be used, this preferred orientation allows the spray to travel in a direction perpendicular to the direction that the secondary conveyor 17 is moving.

The spray 61 generated by the ultrasonic atomizer 60 is polydisperse in nature. Polydisperse as used herein defines a spray 61 composed of droplets having various different diameters and various different velocities. As a result, the droplets fall out of the main spray stream at different times as the spray 61 travels across the width of the secondary conveyor 17. Typically, the small droplets fall out quickly on a first portion of the secondary conveyor 17 and the larger droplets travel farther. This phenomena can best be illustrated by use of an equation for the penetration value L that equates to the distance that a droplet travels across the width of the secondary conveyor 17. The penetration value L for a single droplet having a size or diameter D, with an initial horizontal velocity V, wherein p is the liquid density and 11 is the air viscosity is defined by the equation:

$$L = \frac{\rho D^2 V}{18\mu}$$

Figure 6:
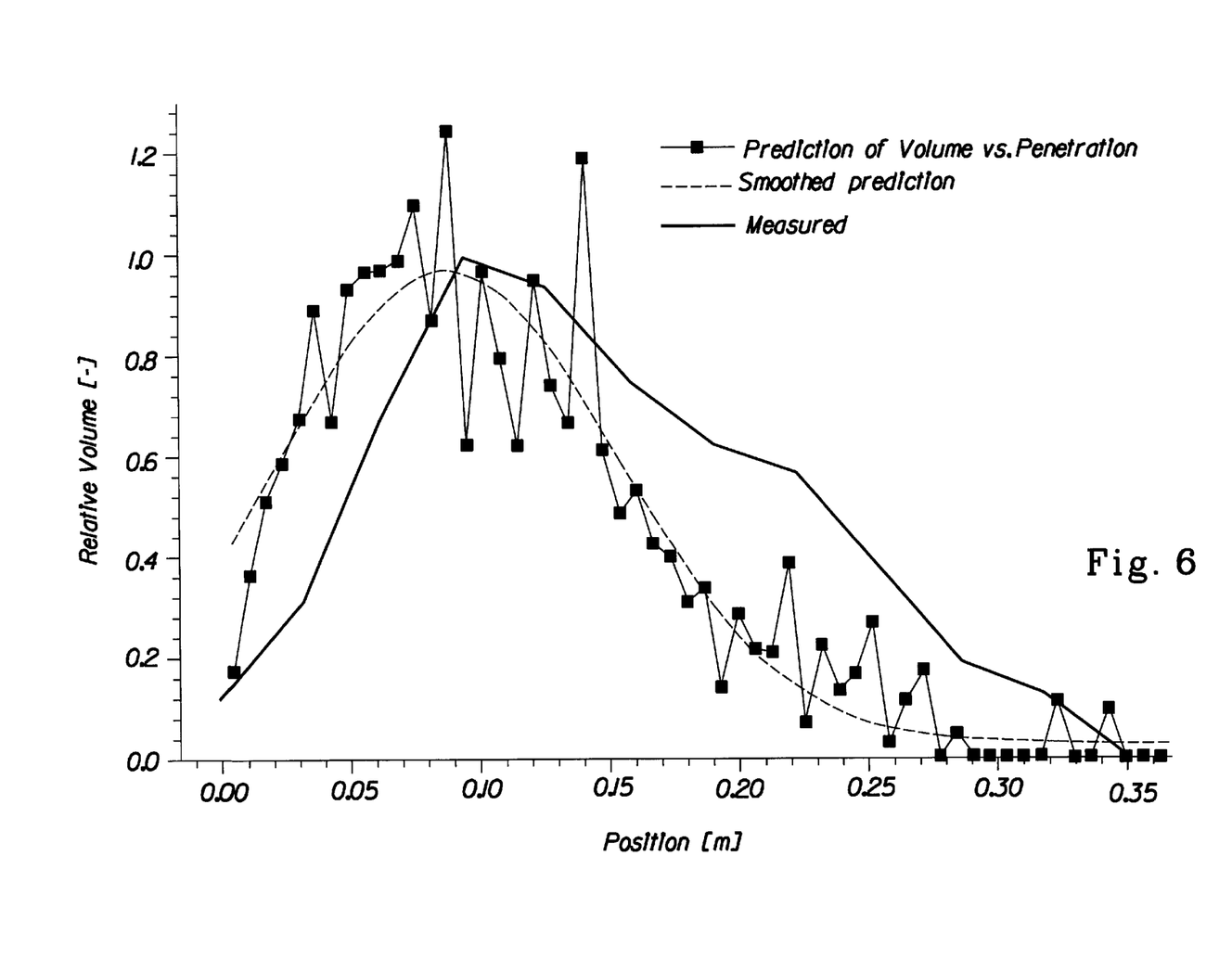
FIG. 6 is a chart of the liquid distribution across the width of the conveyor from use of the liquid coating apparatus according to the present invention; and, FIG. 7 is a side elevation sectional view of an alternative embodiment of the ultrasonic atomizer.

Preferably, the distribution of droplet sizes and the fact that the droplets have substantially horizontal velocities ensure that substantially the entire width of the secondary conveyor 17 is coated with the liquid. Substantially horizontal velocity, as used herein, indicates that the magnitude of the initial velocity in the horizontal direction is greater than the magnitude of the initial velocity in the vertical direction. As the oscillation amplitude of the ultrasonic atomizer 60 decreases the droplet size decreases as a result of the liquid remaining resident for a longer period of time on the face 69 of the tip 68 of the amplifying section 64. This also causes the liquid film on the tip 68 to become thinner. Additionally, the lower viscosity of a hotter liquid can also result in longer residence time on the face 69 of the tip 68 of the amplifying section 64 which similarly results in smaller droplet size and reduced penetration of the atomized spray across the width of the secondary conveyor 17. The liquid distribution across the width of the secondary conveyor 17 for both measured values and values predicted using the penetration value equation are shown in FIG. 6. The position is the distance or penetration value in meters across the width of the secondary conveyor 17 which increases as the distance away from the tip 68 of the ultrasonic atomizer 60 increases. The droplet size and velocity is determined from a sampling of approximately 5000 droplets of a vegetable oil having a flow rate of about 19 ml/min at a temperature of about 90° F. taken at a distance of ½ inch away from the tip 68. These measurements are taken using a particle analyzer available from Aerometrics Inc. under the tradename Phase Doppler particle analyzer.

The widths of the primary conveyor 16 and secondary conveyor 17 are preferably between about 5 to 20 inches, and more preferably about 10 to 15 inches, and most preferably about 14 inches. In a preferred embodiment the primary and secondary conveyors 16, 17 have the same width. Alternatively, the primary conveyor 16 can have a width that is larger or smaller than the secondary conveyor 17 and a transition piece can be provided between the primary conveyor 16 and the secondary conveyor 17. As used herein the term conveyor can be any mechanism or article that is used to transport or move items from one location to another. For example a conveyor can be a continuously moving apparatus, an intermittently moving apparatus, or can simply be a pan that is physically moved from one location to another. Preferably, the primary conveyor 16 and secondary conveyor 17 include a belt that is made of an open metal wire mesh, such as stainless steel. This belt supports the food product. Consequently, any excess oil sprayed from the liquid coating apparatus 50 that does not adhere to the food product will pass through the secondary conveyor 17 and be collected in a catch basin 19 located under the secondary conveyor 17. Preferably this catch basin 19 is removable for easy access and cleaning.

Figure 7:
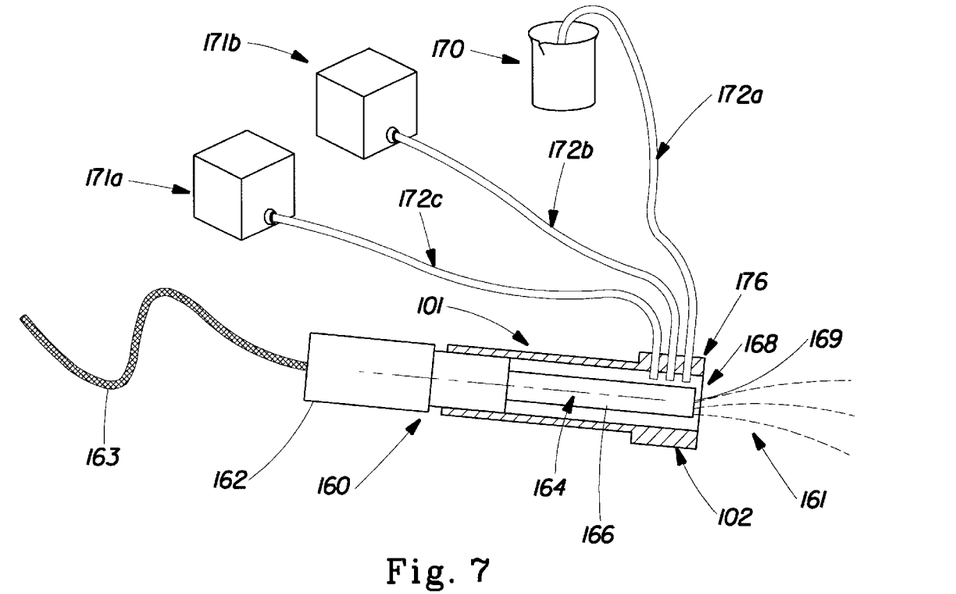

In an alternative embodiment, as shown in FIG. 7, the liquid coating apparatus 50 can have a plurality of feed tubes 172a, 172b, 172c arranged adjacent to the amplifying section 64. These feed tubes 172a, 172b, 172c can connect to a positioning collar 101 which supports the dispensing ends of the feed tubes 172a, 172b, 172c while being spaced away from the exterior surface 66 of the amplifying section 64. The positioning collar 101 can be press fit onto the ultrasonic vibrator 62 at one end and have a shoulder 102 that supports the plurality of feed tubes 172a, 172b, 172c at the opposite end adjacent to the tip 68. This plurality of feed tubes 172a, 172b, 172c enables a plurality of reservoirs or containers 170, 171a, 171b having different or multiple types of liquids to be used with the ultrasonic atomizer 60 at the same time in mixtures or individually. All or some of these liquids can then be easily sprayed from the tip 68 in an atomized spray. Thus, various characteristics such as flavors, colorants, seasonings, or the like, can be mixed together in order to provide the consumer with a wide variety of food product choices without having any additional waiting time for their food product to be finished. This configuration also avoids the added expense of having batches of food product prepared with different characteristics awaiting potential customers and possibly becoming stale in the interim.

The Granular Dispensing Apparatus

In order to apply a small amount of flowable solids such as crystals, flakes, pellets, powders, solid particles, or granular seasonings such as salts, sugars, spices, flavorings, and flavor crystals onto the food product, a granular dispensing apparatus is utilized, generally indicated as 80 in FIG. 1. Preferably, the flowable solids include particles that are substantially spherical. More preferably, the flowable solids such as granular seasonings are applied after the food product is coated with a light coating of a liquid such as vegetable oil. As the food product is conveyed from the liquid coating apparatus 50 the granular dispensing apparatus 80 is automatically activated by a second sensor 28 located adjacent to the secondary conveyor 17. This second sensor 28 can detect the presence of food product on the secondary conveyor 17 as it approaches the granular dispensing apparatus 80. This granular dispensing apparatus 80 can be made integral with the oven 15 or liquid coating apparatus 50 and can alternatively be an independent component or even an internal component of the oven 15. When french fries are used as the food product, the application of salts and other granular seasonings can improve the taste or even change the flavor of the final finished french fries.

The granular dispensing apparatus 80 includes a vibratory feeder assembly 82 and a flowable particulate distributor 90, as shown in FIG. 1. This flowable particulate distributor 90 is positioned just above the secondary conveyor 17 in order for the flowable solids to be dropped or dispensed onto the food product riding on top of the secondary conveyor 17. This granular dispensing apparatus 80 provides for the distribution of a low flow or low volume distribution of flowable solids or solid particles over the width of the secondary conveyor 17. Low flow as used herein indicates a flow rate for flowable solids of less than about 1 g/s. The flowable solids are distributed in a controlled manner such that a substantially even distribution across the width of the secondary conveyor 17 is achieved.

Alternatively, a commonly known granular dispensing apparatus 80 can be used with this finishing system 10 when modified for flows of less than about 1 g/s. For example, a salt and seasoning dispenser available from FEDCO under the tradename THE EQUALIZER and described in U.S. Pat. No. 4,529,107 issued to Morine et al. on Jul. 16, 1985, or a salt seasoner applicator available from ALLEN under the tradename COATRONIC model number SS66.5/36, or the vibrating applicator for particled material described in U.S. Pat. No. 3,012,697 issued to Rouse, Jr. et al. on Dec. 12, 1961, can alternatively be used as the granular dispensing apparatus 80.

As a result of the use of this invention, oven finished fries can be produced that are virtually indistinguishable from french fries which have been cooked using a deep frying process. For example, the oven finished french fries are golden brown in color and have a crisp crust and a moist interior. The finished french fries also have a texture, mouth yield and taste which closely resembles commercially prepared french fried potatoes that have been prepared by deep oil frying, such as at McDonalds. Besides being advantageous from a taste, texture, and appearance standpoint, the invention disclosed herein helps to assure freshly delivered food products in flavorful variations which have been heretofore unavailable. Moreover this invention also offers an economical advantage since there is a reduction in the amount of money expended on cooking oil which is one of the major expenditures incurred by the producers of deep oil fried food products. Additional safety advantages result since employees no longer interact with large quantities of hot oils housed in deep fryers.

Analytical Test Method

Total moisture content of finished food products is determined by a forced air oven method as follows:

1. Uniformly grind up a representative sample of finished food product in a blender or conventional food processor.
2. Accurately weigh approximately 5 grams of ground sample (weight "X") into a previously tared metal pan or dish.
3. Place the metal dish containing the sample in a forced air convection oven at 105° C. for 2 hours.
4. After 2 hours, remove the metal dish containing the dried sample and allow to cool to room temperature in a desiccator over a desiccant such as anhydrous calcium sulfate.
5. Re-weigh the dish containing the dried sample and calculate the weight of the dried sample (weight "Y") by subtracting the dish tare weight.
6. Calculate the percent total moisture of the sample as follows:

$$\% \text{ Total Moisture} = [(X-Y)/(X)] \times 100.$$

Although particular embodiments as well as preferred processing steps of the present invention have been shown, disclosed, and illustrated, the functional equivalents of each can be substituted without departing from the spirit or nature of the present invention. The terms used in describing the invention are used in their descriptive sense and not as terms of limitation, it being intended that all equivalents thereof be included within the scope of the appended claims.

What is claimed is:

1. A method for dispensing a liquid vegetable oil comprising the steps of:

controlling the temperature and viscosity of the oil;

drawing the oil onto a face of an amplifying section;

oscillating the amplifying section;

forming a film from the oil on the face;

generating surface waves on the film;

detaching droplets from the surface waves; and imparting a substantially horizontal velocity to the detached droplets.

2. A method for dispensing a liquid comprising the steps of:

controlling the temperature and viscosity of a liquid;

drawing the liquid onto a face of an amplifying section;

oscillating the amplifying section;

forming a film from the liquid on the face;

generating surface waves on the film;

detaching droplets from the surface waves;

imparting a substantially horizontal velocity to the detached droplets; and supplying multiple liquids from multiple reservoirs to the face of the amplifying section.

* * * * *